Patented May 4, 1943

2,318,373

UNITED STATES PATENT OFFICE 2,318,373

NONRESINOUS CONDENSATION PRODUCT

Frank M. Clark, Pittsfield, Mass., assignor to General Electric Company, a corporation of New York No Drawing. Application November 22, 1940, Serial No. 366,754

6 Claims. (Cl. 252—64)

The present invention comprises a range of viscous liquid and semi-solid compositions which are characterized by superior dielectric properties which are derived by the treatment at elevated temperature of aromatic alcohol, or a mixture of such alcohols, with a dehydrating and condensing agent followed by suitable purification as will be described.

It has been suggested heretofore to treat aromatic alcohols with sulfuric acid at temperatures and other reaction conditions effective for forming resinous compounds. These resinous compounds, however, are unsuited for application as electrical insulation. I have found, as a result of careful chemical control, that the reactions occurring when an aromatic alcohol, such for example as benzyl alcohol, is treated with a dehydrating reagent can be so regulated as to produce dielectric liquids the viscosity of which may be chosen over a wide range. Products may be made having the low viscosity characteristic of transformer oils, as well as products of higher viscosity such as those suitable for solid type high voltage cables (viscosity 2000 seconds Saybolt Universal at 100° C.) and for pot head application (viscosity 5000 seconds at 100° C.). The materials made in accordance with my present invention are considered as non-resinous polymerization products. The complete reaction consists in part of a condensation step with the resulting formation of one or more ether group bondings.

Benzyl alcohol is a material unsuited, because of its characteristically high dielectric loss, for application in high voltage electrical devices. The polymerization and condensation reactions herein described, however, result in derivation products of high dielectric properties well suited for application in high voltage electrical apparatus. These products are chemically stable and under long-continued high voltage tests are of demonstrated electrical stability. Their high dielectric strength and low electrical conductivity properties render such products peculiarly well adapted for use as dielectric and cooling media.

Although a variety of polymerization and condensing agents such as concentrated sulfuric acid, phosphorous pentoxide, boric anhydride, and zinc oxide can be employed in the preparation of the products of my invention, I prefer to employ sulfuric acid. While I prefer benzyl alcohol ($C_6H_5CH_2OH$) as the alcoholic component, other aromatic alcohols are suitable, as for example, tolyl alcohol ($CH_3C_6H_4CH_2OH$) and beta phenyl ethyl alcohol ($C_6H_5CH_2CH_2OH$), also secondary alcohols of the type represented by alpha phenyl ethyl alcohol ($C_6H_5CH(OH) \cdot CH_3$).

In the illustrative examples of my invention to be later described, it is to be understood that the acid reagent is added with stirring to the reacting alcoholic component. Since heat is generated on the addition of the acid reagent, great care must be exercised since the extent of the polymerization and condensation obtained is a distinct function of the reaction temperature as well as the concentration of the reactants. Unless proper precautions are exercised excessively high temperatures may be obtained. When the reacting solution is adequately cooled, a clear yellow solution is obtained from which a liquid layer separates when the temperature reaches the range of 85° to 90° C. The lower layer is largely acidic. The top layer contains the reaction product in solution with the excess aromatic alcohol, from which the desired product is freed as by distillation.

The reaction product is purified and prepared for electrical application by means of processes well known in chemical art. For example, it may be washed free from acid by the use of a weak alkaline solution, dried by blowing with nitrogen or by paper filtration and freed from dissolved or suspended conducting impurities by treatment with fuller's-earth, carbon black or other suitable absorbent.

Commercial concentrated sulfuric acid (96%) may be used in the preparation of the products of my invention although its use necessitates greater precautions in controlling the rapidity and the extent of the reaction. In general, it is preferable to use sulfuric acid of lesser concentration, as for example, an acid concentration ranging from 50 to 85 per cent. These lesser concentrations are especially suitable for the preparation of the lower viscosity liquids suitable for transformer, circuit breaker and oil-filled cable fields.

Illustrative of my invention, I have hereinafter described the preparation of a series of dielectric liquids suitable for a wide range of applications in electrical apparatus. In the examples illustrated, I have used an acid of a concentration of 60 per cent and a reaction temperature of 120° C. in order to bring out more clearly the importance of proper control of the chemical reaction and the variety of products thereby obtained. As already stated, other suitably selected combinations of acid concentration, reaction temperature and reaction time can be employed, the heat treatment being discontinued before resinification occurs.

Example 1

An insulating liquid suitable for use as an impregnant for high voltage capacitors, circuit breakers, oil-filled paper-insulated cables, high voltage bushings, and the like, is most suitably prepared by adding slowly and with constant agitation 60 per cent concentrated sulfuric acid to a selected aromatic alcohol, for example, benzyl alcohol. The temperature preferably is maintained not higher than 75° C. The amount of acid used should equal by volume the amount of aromatic alcohol present. After stirring, a clear solution of the ingredients is obtained and the temperature is slowly raised over a period of approximately three to five hours to 120° C. at which value the temperature is maintained for one hour. During this heat treatment, two layers are formed in the reaction mixture. The bottom layer consists largely of acid and after cooling to room temperature is separated by gravity from the top layer which contains the desired product together with some unreacted alcohol. This mixture is heated under a pressure of less than 20 mm. of mercury to a temperature of 190 to 195° C. during which treatment the excess alcohol is distilled off. The residual product is substantially non-volatile and is washed with a weak (2%) alkaline solution, then with water and finally dehydrated by heating under a vacuum, blowing with dry nitrogen gas or filtered through dry paper in accordance with known methods. The electrical properties as usually obtained are satisfactory, but can be further improved by treatment of the product with fuller's-earth, carbon, bauxite or other suitable absorbent.

The material so obtained from benzyl alcohol has the following properties:

Refractive index (25° C.) _____ 1.6023
Viscosity at 25° C. _____ 260 seconds Saybolt Universal
Specific gravity at 25° C. _____ 1.085
Color _____ 1½ NPA
Reactivity _____ Neutral The material is chemically stable and shows little change even when heated in contact with air and iron or aluminum metals at 120° C. No evidence of metallic corrosion is observed.

Example 2

A liquid suitable for medium voltage capacitor and liquid-filled high voltage bushings is obtained by the treatment of benzyl alcohol when the period of heat treatment at 120° C. is extended from one hour as illustrated in Example 1, to one and one-quarter hours, all other treatment being unchanged. The characteristics of such a liquid are:

Refractive index (25° C.) _____ 1.6121
Viscosity (25° C.) _____ 845 seconds Saybolt Universal
Specific gravity (25° C.) _____ 1.095
Pour point _____ −9° C.
Reactivity _____ Neutral
Color _____ 1½ NPA This compound shows excellent chemical and electrical stability when heated in air at 120° C. in contact with metals such as iron and aluminum. No corrosive action on the metals is observable.

Example 3

Continuation of the heating period at 120° C. to one and one-half hours, other treatment being exactly as illustrated in Example 1, yields a viscous liquid well suited as an impregnant for low voltage capacitors and the "solid type" of paper insulated high voltage cable thus obtained from benzyl alcohol compound is characterized by a high degree of chemical and electrical stability and has the following properties:

Refractive index _____ 1.6205
Viscosity (25° C.) _____ 4000 seconds Saybolt Universal
Specific gravity _____ 1.100
Pour Point _____ 3° C.
Color _____ 2½ NPA
Reactivity _____ Neutral

Example 4

Because of the more rapid reaction, the highly viscous products suitable as a filling compound for pot heads and cable points are most easily prepared at a higher reaction temperature. Illustrative of such a preparation, I may use 140° C. as the reaction temperature. When equal volumes of 60 per cent concentrated sulfuric acid and benzyl alcohol are mixed and heated at 140° C., the reaction proceeds rapidly and smoothly. After one half to three quarters hour of reaction at 140° C. a product is obtained which is well adapted for use alone or in compound blend as a pot head and cable joint filling compound. The properties of such a compound are:

Refractive index _____ 1.6416
Viscosity _____ 8500 seconds at 100° C.
Flow point _____ 40 to 60° C.
Color _____ 3½ to 4 NPA
Reactivity _____ Neutral This compound is of high chemical and electrical stability when heated at 120° C. Substantially no change is observed after ten days heat treatment at 120° C. in contact with air.

The chemical and electrical stability of my improved dielectric and cooling products are best illustrated with reference to the power factor of paper insulation impregnated with typical products, as determined in a typical commercial capacitor assembly, the electrodes being of .0003 inch aluminum foil spaced apart by three sheets of .0004 inch kraft capacitor tissue. Such an assembly when impregnated with mineral oil gives a power factor of .25 per cent when tested at 330 volts 60 cycles. When placing on continuous voltage at 880 volts alternating current, such capacitors do not have unlimited life. Dielectric failures are obtained to an extent that after seventy days operation only 60 per cent of the units can be expected to be still functioning satisfactorily.

When my improved dielectric compounds are used to impregnate the capacitor dielectric referred to, improved results are obtained as illustrated in the following tabulation in which the first column shows the viscosity in seconds Saybolt Universal of the composition. The next column shows the concentration of the acid used, the third column shows reaction temperature and the fourth column the reaction time of the method of preparation. The last two columns show respectively the initial and the final power factor after seven months' operation at 880 volts:

| Viscosity | Conc. | Temp. | Time | Power factors | |
|---|---|---|---|---|---|
| | Per cent | °C. | | Per cent | Per cent |
| 1300 at 25° C | 60 | 140 | 20 min. | .40 | .41 |
| 5000 at 25° C | 60 | 120 | 2 hrs. | .21 | .23 |
| 8500 at 100° C | 60 | 140 | 45 min. | .33 | .31 |

Unlike the behavior of mineral oil-filled capacitors of like design, no dielectric failures were obtained during the voltage life test.

In the foregoing examples illustrative of my improved products, I have confined the description to certain concentrations, times and temperatures of reaction. I have also, for purpose of clarity, illustrated the reaction products obtained from equal proportions of sulfuric acid and benzyl alcohol. My invention, however, is not to be considered as limited to these illustrative examples. The concentration of the acid, the proportion of the alcohol and the acid, and the combinations of time and temperature all may be varied without departing therefrom. For example, with acid concentrations ranging from 50 per cent to 96 per cent sulfuric acid, I have produced products of similar character when departing from the 1:1 ratio of acid to alcohol to as much as 1 part of acid to 15 parts of alcohol. To one skilled in the chemical art, it is obvious that such variation in the reactants are possible when accompanied by correspondingly suitable variation in the reaction conditions of time and temperature.

In illustrating the value and application of my new products, I have laid especial emphasis on the importance of these materials as dielectric and cooling materials for electrical apparatus such as transformers, capacitors, electric cables, circuit breakers, electric bushings, pot heads and cable joints. Because of their remarkable stability, these compounds have equal utility as lubricants either used alone or in admixture with the more commonly used mineral oils. Their high visocity, tackiness, and remarkable filming and thread-forming properties insure improved protection against wear and metallic corrosion under the most extreme conditions of lubricant use.

What I claim as new and desire to secure by Letters Patent of the United States is:

1. A range of neutral liquid condensation products having viscosities at 25° C. at least as high as about 260 seconds Saybolt Universal and being formed by the interaction of aromatic alcohol and a condensing agent at about 120 to 140° C., said products being chemically stable when heated in contact with air at 120° C.

2. A range of neutral non-resinous, viscous condensation products formed by the interaction of benzyl alcohol and sulphuric acid at temperatures within a range of 120 to 140° C.

3. A range of non-resinous condensation products derived by the heat treatment of aromatic alcohol with a dehydrating and condensing agent and having viscosities varying from 260 seconds Saybolt at 25° C. to 8500 seconds Saybolt at 100° C., said products being of neutral reactivity, chemically stable when heated to 120° C. for periods as long as ten days in contact with air.

4. The process of forming liquid non-resinous condensation products which consists in heating for several hours at temperatures within a range of 120° C. to 140° C. aromatic alcohol and a reagent producing dehydration and condensation, cooling the reaction mass sufficiently to avoid the occurrence of resinification, separating the reaction product from non-reacting ingredients and freeing said product from impurities and drying the same.

5. The process of forming liquid non-resinous condensation products which consists in heating for several hours at temperatures within a range of about 120° C. to 140° C. benzyl alcohol and sulfuric acid, discontinuing said heating after the reaction mass has separated into layers but before resinification occurs, and separating the reaction product from non-reacting ingredients and finally dehydrating said products.

6. A non-resinous dielectric material suitable for use in electric devices resulting from the reaction at elevated temperatures of benzyl alcohol and sulphuric acid, said material being chemically stable when subjected to protracted heating at temperatures up to 120° C., and having a viscosity at 25° C. at least as high as about 260 seconds Saybolt.

FRANK M. CLARK.